United States Patent
Shifman et al.

(10) Patent No.: US 11,609,789 B2
(45) Date of Patent: Mar. 21, 2023

(54) DEVICE, SYSTEM AND METHOD FOR PROCESSING DATA

(71) Applicant: OSR ENTERPRISES AG, Cham (CH)

(72) Inventors: Orit Shifman, Petah Tikva (IL); Elhanan Shifman, Petah Tikva (IL)

(73) Assignee: OSR ENTERPRISES AG, Cham (CH)

( * ) Notice: Subject to any disclaimer, the term of this patent is extended or adjusted under 35 U.S.C. 154(b) by 0 days.

(21) Appl. No.: 16/606,115

(22) PCT Filed: Apr. 9, 2018

(86) PCT No.: PCT/IL2018/050408
§ 371 (c)(1),
(2) Date: Oct. 17, 2019

(87) PCT Pub. No.: WO2018/193439
PCT Pub. Date: Oct. 25, 2018

(65) Prior Publication Data
US 2020/0050492 A1 Feb. 13, 2020

Related U.S. Application Data

(63) Continuation of application No. 15/491,267, filed on Apr. 19, 2017, now abandoned.

(51) Int. Cl.
*G06F 9/50* (2006.01)
*H04L 29/06* (2006.01)
(Continued)

(52) U.S. Cl.
CPC .......... *G06F 9/5027* (2013.01); *H04L 67/10* (2013.01); *G06F 9/5005* (2013.01);
(Continued)

(58) Field of Classification Search
CPC ............ G06F 9/5027; G06F 2209/509; G06F 9/5005; G06F 9/5038; G06F 9/5055; G06F 9/5066; H04L 67/10
See application file for complete search history.

(56) References Cited

U.S. PATENT DOCUMENTS

| 7,739,686 B2* | 6/2010 | Gebhart ............ G06F 9/505 718/103 |
| 8,849,687 B2* | 9/2014 | Hakim ............ H02J 3/466 705/7.13 |

(Continued)

FOREIGN PATENT DOCUMENTS

| WO | WO 2006/010263 | 2/2006 |
| WO | WO 2016/059122 | 4/2016 |

OTHER PUBLICATIONS

"Clone Cloud: Elastic Execution between Mobile Device and Cloud"—Chun et al, Intel Labs Berkeley & Princeton Univ., Nov. 2011 https://eurosys2011.cs.uni-salzburg.at/pdf/eurosys2011-chun.pdf (Year: 2011).*

(Continued)

*Primary Examiner* — Randy A Scott
(74) *Attorney, Agent, or Firm* — Pearl Cohen Zedek Latzer Baratz LLP

(57) ABSTRACT

A method, apparatus and computer program product, the method comprising: receiving by a device present at a mobile environment, data relating to a computerized task; obtaining information related to a future state of the device or the mobile environment or another device within the mobile environment; determining indications for resource availability associated with the future state; determining a scheme for performing at least part of the computerized task offsite, in accordance with the resource availability; and transmitting data over a communication channel to a remote (Continued)

computing platform for performing the at least part of the computerized task offsite, in accordance with the scheme.

13 Claims, 3 Drawing Sheets

(51) Int. Cl.
   *H04L 29/08* (2006.01)
   *H04L 67/10* (2022.01)
(52) U.S. Cl.
   CPC .......... *G06F 9/5038* (2013.01); *G06F 9/5055* (2013.01); *G06F 9/5066* (2013.01); *G06F 2209/509* (2013.01)

(56) References Cited

U.S. PATENT DOCUMENTS

| | | | |
|---|---|---|---|
| 9,233,620 B2* | 1/2016 | Hara | ........................ B60L 53/16 |
| 2010/0257228 A1 | 10/2010 | Staggs | |
| 2012/0109409 A1 | 3/2012 | Hara | |
| 2012/0265884 A1* | 10/2012 | Zhang | ................... G06F 9/5044 |
| | | | 709/226 |
| 2012/0266176 A1* | 10/2012 | Vojnovic | ............... G06F 9/5038 |
| | | | 718/104 |
| 2014/0195469 A1* | 7/2014 | Barrett | ................. G01C 21/362 |
| | | | 706/46 |
| 2015/0244715 A1* | 8/2015 | Narayan | ............... H04W 12/64 |
| | | | 726/5 |
| 2018/0262016 A1 | 9/2018 | Baughman et al. | |

OTHER PUBLICATIONS

"Perception, Planning, Control, and Coordination for Autonomous Vehicles"—SD Pendelton, MDPI, Feb. 17, 2017 https://www.mdpi.com/2075-1702/5/1/6/pdf (Year: 2017).*

Byong-Gon Chun et al. CloneCloud: Elastic Execution between Mobile Devices and Cloud, EuroSys'11, Apr. 10-13, 2011, Salzburg, Austria.

* cited by examiner

DEVICE, SYSTEM AND METHOD FOR PROCESSING DATA

CROSS-REFERENCE TO RELATED APPLICATIONS

This application claims the benefit of priority from U.S. patent application Ser. No. 15/491,267 filed Apr. 19, 2017, titled "DEVICE, SYSTEM AND METHOD FOR PROCESSING DATA", which is hereby incorporated herein by reference in its entirety without giving rise to disavowment.

TECHNICAL FIELD

Embodiments described herein relate generally to devices, systems and methods for processing data.

BACKGROUND

Many data processing tasks require vast amount of computing resources such as processing power and storage capacity. Hence, many processing tasks are today executed in the "cloud" which may refer to a plurality of interconnected servers providing virtually unlimited computing resources which are shared and accessible via a communication network (e.g., the internet) by a multitude of clients. Accordingly, the interconnected servers may be configured to provide virtually unlimited data storage and processing functionalities to the multitude of clients enabling, for example, the running of applications in the cloud rather than by the client. The running of applications in the cloud for onsite use by users is sometimes referred to as "cloud computing". In recent years, cloud computing gained increased popularity for obviating the need of onsite application installation.

The description above is presented as a general overview of related art in this field and should not be construed as an admission that any of the information it contains constitutes prior art against the present patent application.

BRIEF SUMMARY

One exemplary embodiment of the disclosed subject matter is a computer-implemented method for processing data, comprising: receiving by a device present at a mobile environment, data relating to a computerized task; obtaining information related to a future state of the device or the mobile environment or another device within the mobile environment; determining indications for resource availability associated with the future state; determining a scheme for performing at least part of the computerized task offsite, in accordance with the resource availability; and transmitting data over a communication channel to a remote computing platform for performing the at least part of the computerized task offsite, in accordance with the scheme. Within the method, determining the scheme optionally comprises: determining two or more schemes for performing at least part of the computerized task offsite; computing a cost for each scheme of the schemes; and selecting a scheme from the schemes for which the cost is lower. Within the method, the cost function takes into account available bandwidth for transmitting data to an external network and receiving data form the external network. Within the method, the cost function optionally takes into account required criticality of operations or of data. Within the method, the cost function optionally takes into account one or more factors selected from the group consisting of: performance parameters of device, the offsite computing platform and other device within the mobile; and required accuracy of the computerized task. Within the method, the data relating to the computerized task optionally comprises one or more constraints, and the schemes optionally comply with the constraints. Within the method, any of the constraints is optionally selected from the group consisting of: completion of the computerized task; timely completion of the computerized task if a task completion time is specified; data security and data criticality. Within the method, the information related to the future state optionally includes information received from a navigation system. Within the method, the information related to the future state includes information is optionally received from a calendar event. Within the method, the scheme is dynamically updated. The method can further comprise determining when the scheme is to be reassessed, and subject to determining that the scheme is to be reassessed, repeating said receiving the data relating to a computerized task; said obtaining the information related to the future state; said determining indications for resource availability; or said determining the scheme.

Another exemplary embodiment of the disclosed subject matter is an apparatus having a processing unit and a storage device, the processor being adapted to perform the steps of: receiving by a device present at a mobile environment, data relating to a computerized task; obtaining information related to a future state of the device or the mobile environment or another device within the mobile environment; determining indications for resource availability associated with the future state; determining a scheme for performing at least part of the computerized task offsite, in accordance with the resource availability; and transmitting data over a communication channel to a remote computing platform for performing the at least part of the computerized task offsite, in accordance with the scheme. Within the system, the processor is optionally further adapted to perform the steps of: determining two or more schemes for performing at least part of the computerized task offsite, wherein the computerized task is expected to be performed as required, in accordance with the resource availability; computing a cost for each scheme; and selecting a scheme for which the cost is lower. Within the system, the processor is optionally further adapted to perform the steps of: determining when the scheme is to be reassessed; and repeating said receiving the data relating to a computerized task; said obtaining the information related to the future state; said determining indications for resource availability; or said determining the scheme.

Yet another exemplary embodiment of the disclosed subject matter is a computer program product comprising a computer readable storage medium retaining program instructions, which program instructions when read by a processor, cause the processor to perform a method comprising: receiving by a device present at a mobile environment, data relating to a computerized task; obtaining information related to a future state of the device or the mobile environment or another device within the mobile environment; determining indications for resource availability associated with the future state; determining a scheme for performing at least part of the computerized task offsite, in accordance with the resource availability; and transmitting data over a communication channel to a remote computing platform for performing the at least part of the computerized task offsite, in accordance with the scheme.

BRIEF DESCRIPTION OF THE SEVERAL VIEWS OF THE DRAWINGS

The figures illustrate generally, by way of example, but not by way of limitation, various embodiments discussed in the present document.

The drawings taken with description make apparent to those skilled in the art how the present technology may be embodied in practice.

Figure 1:
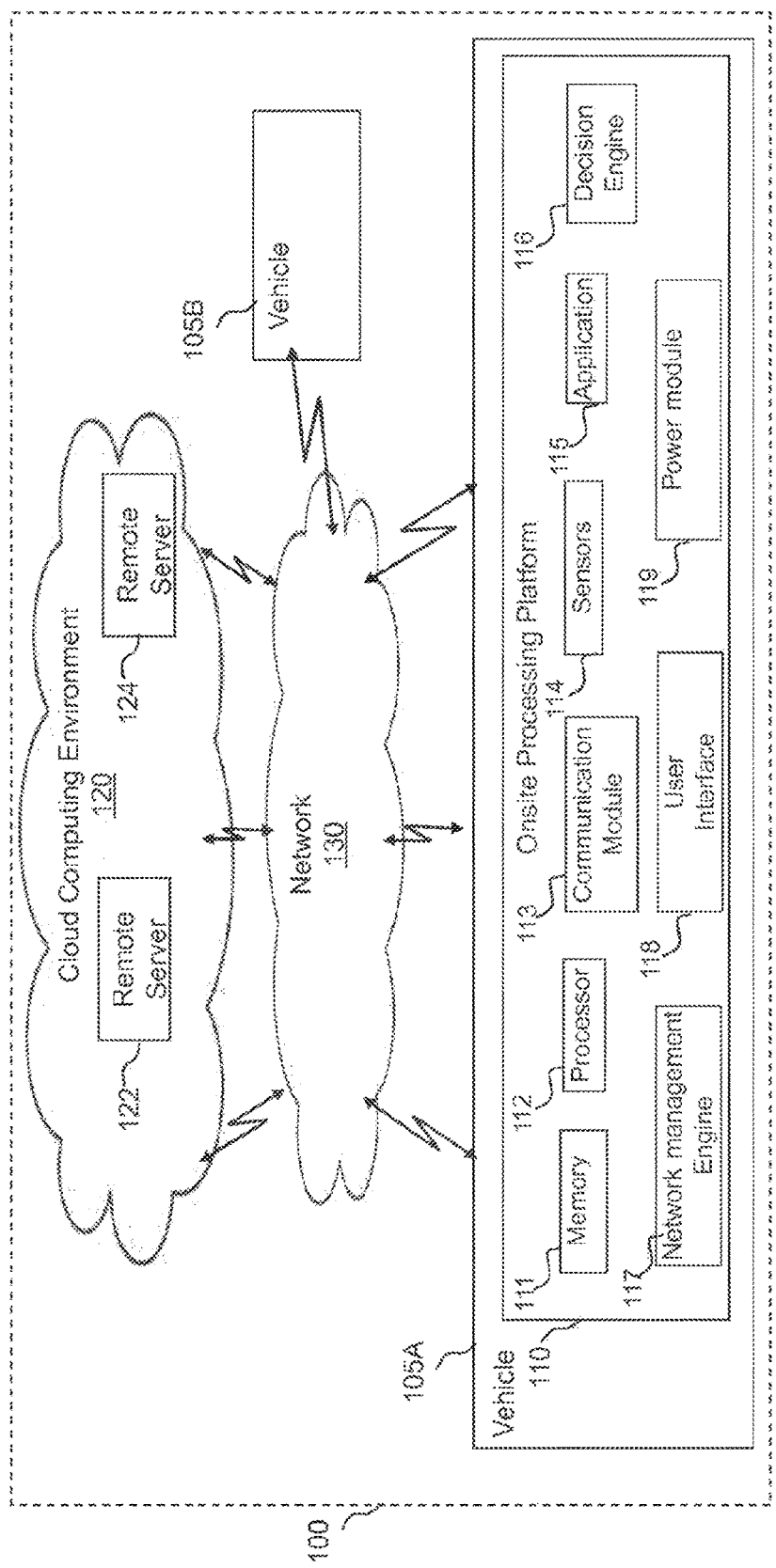

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical but may not be referenced in the description of all figures.

Figure 2:
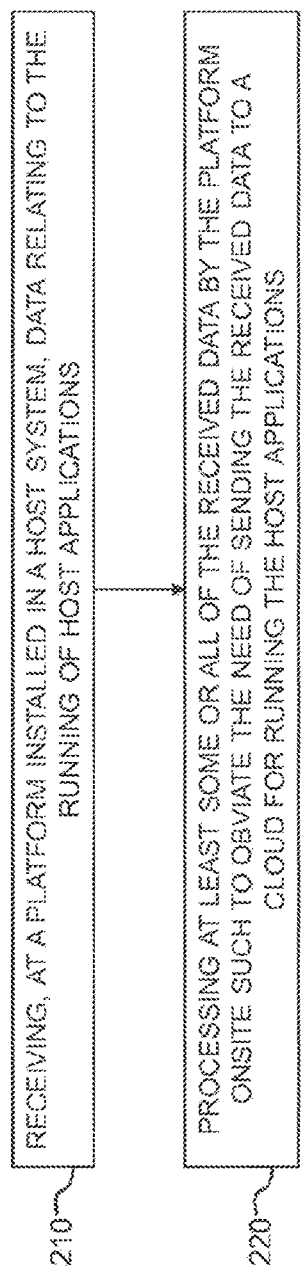
Figure 3:
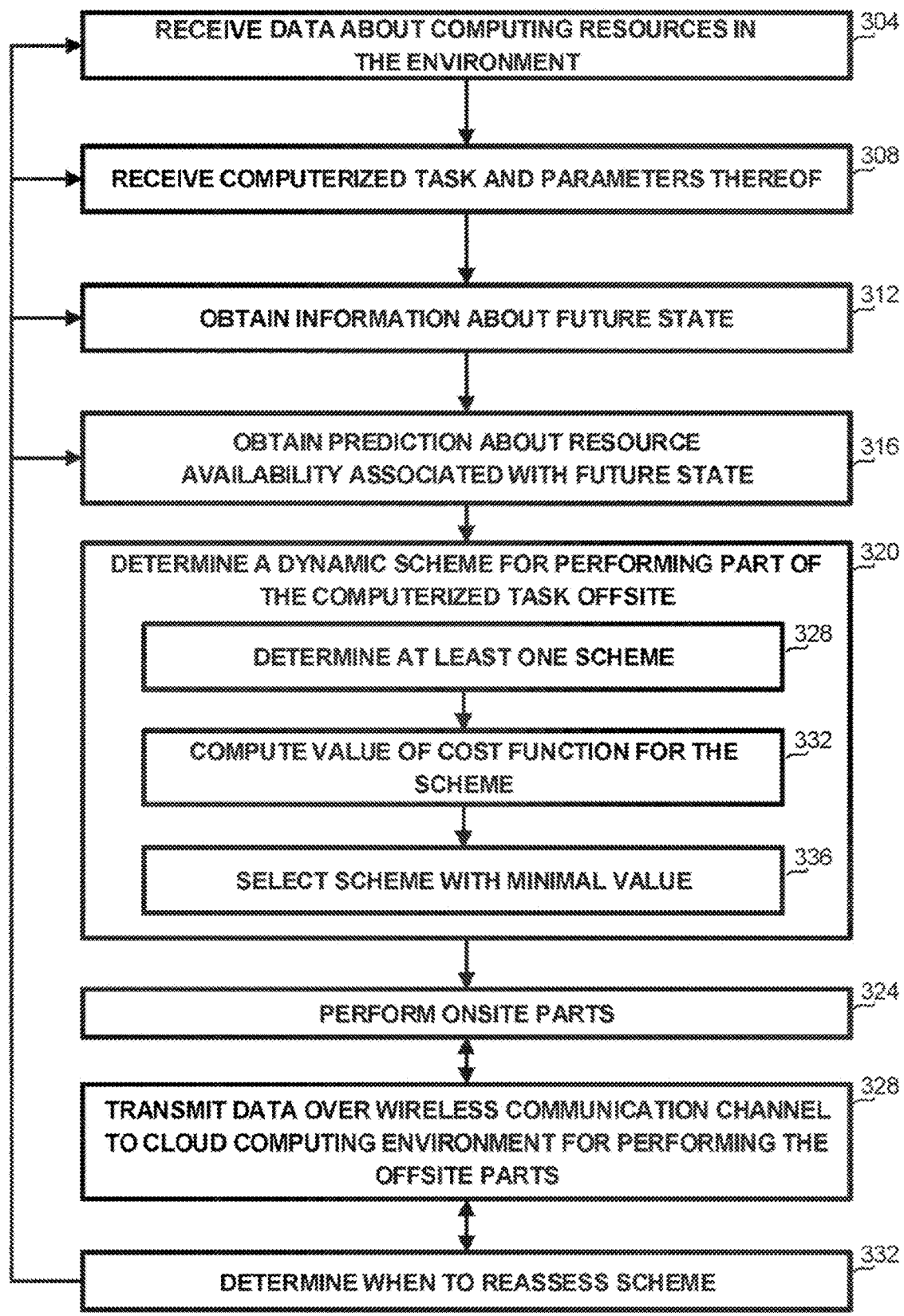

FIG. 1 is a schematic block diagram illustration of a system for processing data, according to some embodiments;

FIG. 2 is a schematic flow chart diagram of a method for processing data, according to some embodiments; and FIG. 3 is a schematic flow chart of a method for processing data using predictive considerations, according to some embodiments.

DETAILED DESCRIPTION

The following description of devices, systems and methods for processing data is given with reference to particular examples, with the understanding that such systems and methods are not limited to these examples Aspects of embodiments disclosed herein relate to systems, devices and/or methods for the processing of data. For example, embodiments disclosed herein may be disclosed in conjunction with the processing of data by a platform which is installed in a host system such as, for example, a vehicle or vehicular system. It should be noted that the platform may run or execute applications which are not necessarily exclusively related to vehicular or vehicle-related applications. Hence, platform may be additionally or alternatively operably installed in host systems other than vehicles.

Embodiments of the devices, systems and/or methods disclosed herein may be configured to overcome bottleneck situations relating to cloud-based systems serving a multitude of clients. The causes for bottleneck situations in a cloud-based data processing system may be the result of, for example, increased data (e.g., metadata) transfer requirements which may cause network overload due to bandwidth limitations of the network. Network overload or using a network to its capacity limits may result in unstable network connections. Bottleneck situations may therefore, in some instances, cause difficulties relating to communication coverage, e.g., in non-urban or rural areas.

According to some embodiments, a platform for processing data may be configured to have computing resources which obviates the need of employing cloud-based computing for performing most or all application tasks. For example, the platform may be configured to allow performing a host application task which is the result of onsite (or: on-site) processing only of instructions, without requiring providing data wirelessly to remotely located servers of the cloud for remote execution of the instructions by such servers.

The terminology "onsite processing" as well as grammatical variations thereof as used herein with reference to data processing relates to the execution of a task in a system's "site of interest" or "location of interest" of a user of the host system, e.g., where a user may be impacted, directly or indirectly, by execution of the application task. A site of interest may for example refer to the location in the host system where the user receives information relating to the processed data. On the other hand, terminologies such as "offsite", "off-site processing" or "remote cloud processing" as well as grammatical variations thereof may refer to the processing of data at a location in the system which is located remotely from the user's site or location of interest.

For example, data may be processed onsite by a platform comprised in a vehicle for executing vehicular applications. In some embodiments, onsite processing refers to a configuration in which it is not required to employ the services of a cellular operator. In some embodiments, onsite processing may comprise the processing of data using a local "fog" network. In some embodiments, in onsite processing applications, short-range wireless applications may be employed, e.g., as employed in personal area networks (PAN) where transmission distances may be limited to, e.g., less than 10 cm, less than 1 meter, less than 10 meters, less than 50 meters or less than 100 meters.

According to some embodiments, a system may comprise such platform included in a host system, and a cloud environment. The platform, which may for example be installed in a vehicle such as a passenger car, may be considered to be the user's site of interest. Accordingly, data processed by the platform may be considered to be processed onsite. The cloud environment may be considered to be located remotely from the site of interest. Accordingly, data processed in the cloud environment may be considered to be processed offsite. It should be noted that the terms "cloud", and "cloud environment", "remote environment", "remote site" and "remote location", as used herein, may be used interchangeably.

According to some embodiments, the platform may be configured to allow, for example, onsite processing of data without requiring the establishment of wireless communication links with the cloud and/or without requiring the transmission of data from the platform to the cloud for processing of the data for providing an application output to the user onsite. In other words, in some embodiments, the execution of an application task may in its entirety or for most of the time during the running of an application task performed by an integrated computing platform free of long-range wireless communication links established between the platform and the cloud and/or without the transmission of application input data to be processed by the cloud environment. For instance, a wireless communication link may exist between the platform and the cloud, but no application input data may be transmitted over the link, unless, for example, an offsite or remote cloud transmission criterion is met, as will be outlined herein below in more detail.

It will be appreciated that tasks to be completed by a device in a moving environment such a vehicle, may be associated with a multiplicity of constraints and factors. Constraints can generally be defined as factors or parameters of the task that are non-compromisable, wherein whether a factor is compromisable or not may depend on the specific task. For example, any one or more the following may be defined as a constraint or a factor: the completion of a task (or timely completion if a required completion time is specified), data security, data criticality, or the like. The factors which are not constraints may be assigned weights indicating their importance. Thus, each task may be associated with a function that determines a cost for a certain execution, taking into account a grade of each factor and its weight. It will be appreciated that other manners of computing a cost may be designed, and that the disclosure is not limited to weighted average.

According to some embodiments, the decision which tasks or parts thereof can and should be performed onsite, and which can and should be performed offsite, may be taken within the context of the problem to be solved, and the problem's constraints and factors. A multiplicity of options may exist for assigning one or more parts of the task to onsite processing and one or more parts to offsite processing. Thus, for each valid solution which complies with the constraints, a cost function may be calculated, based on the weights and grades assigned to each factor.

Some constraints or factors may include but are not limited to any one or more of the following: bandwidth availability and pricing of data upload and download; the processing power available onsite and offsite, wherein onsite processing power may include the processing power of additional devices available within the environment; battery health of any of the onsite devices; urgency, required response time or required completion time of a task; criticality of a task, e.g., the severity of the task not being completed or being completed at a delay; the task quality, e.g., the required accuracy with which the task is performed onsite and offsite; secrecy of the data associated with each task, e.g., the risk associated with the data being intercepted; the security level provided by the communication channel; price of encrypting an decrypting the transmissions; the amount of data needed to be uploaded and/or downloaded for each task, and others.

However, many of these factors, and especially the ones which are location-dependent, such as bandwidth and prices, may change over time and as the environment moves. For example, in a moving car, currently available bandwidth does not guarantee similar future availability. Thus, attempting to perform offsite a computation that requires uploading of data or downloading of results, may be successful or unsuccessful depending on the time and location at which the operation is attempted.

One solution disclosed herein comprises determining one or more future states of the car or a computing device within the car, wherein a future state may comprise time and location at which the vehicle or the computing platform is expected to be. A location can be identified as a point or as a collection of points, such as a city, a highway, or the like, and a time may be indicated as a specific time or a time range. The location and the time may be determined in any required resolution.

The future states may be obtained from a navigation system set to provide instructions to a specific location. Thus, a destination, a route to the destination (under the assumption that the route will be taken), and estimates of the times at which the car will be at the destination and optionally at specific locations along the route are provided. Additional or alternative future states may be obtained from a calendar of a user, in which locations at which the user has to be at predetermined times are indicated.

Once the times and locations are known, the availability of resources at the locations, and optionally the times, can be predicted, using for example predefined or pre-collected data. For example, in sideways along rural areas, cellular coverage may not exist or be rather weak, and cannot be relied on, thus data communication may be very limited, while in or near cities the availability is usually significantly better. Similarly, if the vehicle is expected to enter a long tunnel, reception may not be available as long as the vehicle is within the tunnel. The price of data connectivity may also vary in accordance with the area, the volume to be transmitted, the data plan of the communicating device, wherein different devices within the vehicle may operate under different plans, or the like.

Given this information and the task to be executed, one or more schemes may be designed which allocate parts of the task to offsite computing devices. The scheme may be determined while verifying that the constraints are met. For example, if completion of a task is a constraint, then the scheme may take into account when data required for a computation associated with task becomes available, when resources for offsite processing of the data are required and whether the resources are expected to be available at that time. For example, it may be determined whether there is sufficient coverage at sufficient bandwidth, such that the required data connectivity is expected.

If multiple schemes are designed or suggested, the cost of each scheme may be determined in accordance with the cost function, and the scheme associated with the lowest cost may be selected and executed.

The relevant data, such as the available computing resources, the task, the future states and available resources at the future states may be reassessed periodically or in response to a certain event. Thus, the scheme may be determined dynamically and may be repeatedly adapted to the changing requirements and resources.

Referring to FIG. 1, a data processing system, herein referenced by alphanumeric label "100", may comprise an onsite processing platform or, simply, platform 110 installable or which is comprised (e.g., installed) in host systems 105 (e.g., vehicles 105A and 105B); and a cloud computing environment or cloud 120 which may comprise one or more remote servers (e.g., remote servers 122 and 124). For the sake of the discussion that follows it may be assumed that a client of platform 110 actively and/or passively engages with a host system. In other words, host system 105A for example may be considered to be the user's site of interest. Accordingly, data processed by platform 110 may be considered to be processed onsite whereas data processed in cloud 120 may be considered to be processed offsite. In an embodiment, onsite processing of data may be performed while platform 110 is in motion (e.g., in a driving car) and/or otherwise operationally installed in host system 105A, to allow vehicle-driver and/or vehicle-passenger interaction while the vehicle is in motion or driving (e.g., fully autonomously, semi-autonomously, or non-autonomously, i.e., for being driven by a driver). Correspondingly, the onsite processing of data received by platform 110 from host system 105A may occur while the platform moves along with the vehicle system in motion.

In some embodiments, based on an offsite transmission criterion, platform 110 may be configured to selectively establish a communication link with cloud 120 over a communication network 130. In some embodiments, based on the offsite transmission criterion, the amount of data transmitted over the communication is limited according to predefined network resources or a bandwidth threshold, as outlined in more detail herein below. The offsite transmission criteria may for example define that in case that the platform's processing power and/or internal bandwidth usage exceeds, for example, 80%, 85, 90%, or 95%, for a predetermined time period of, e.g., at least 1 sec, at least 2 sec or at least 5 sec, application data is to be sent to cloud 120 for processing instead of being processed onsite on platform 110.

In some embodiments, platform 110 may comprise a computerized end-user device which may for example include a multifunction mobile communication device also known as "smartphone", a personal computer, a laptop computer, a tablet computer, a server, a personal digital assistant, a workstation, a wearable device, a handheld computer, a notebook computer, a vehicular system, a stationary device and/or a home appliances control system.

Platform 110 may in some embodiments comprise a memory 111, a processor 112, a communication module 113, and sensors 114. Platform 110 may further employ an application 115, a decision engine 116, a network management engine 117, a user interface 118 and a power module or source 119 for powering the various components, applications and/or engines of platform 110. The various components of platform 110 may communicate with each other over one or more communication buses (not shown) and/or signal lines (not shown). In some embodiments, platform 110 may comprise and/or serve one or more sensors 114 capable of converting a physical stimulus into processable electronic data. In some embodiments, sensors 114 (e.g., image acquisition sensors) may have data processing capabilities, e.g., for establishing a local "fog" network. Sensors 114 may comprise a multitude of sensors (e.g., more than 100, 1000, 10000, 100000, 200000, 500000, or 1000000 sensors). In embodiments, sensors 114 may be used in telemetry applications.

According to some embodiments, memory 111, may include one or more types of computer-readable storage media. Memory 111 may for example include transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 111, may, for example, process temporally-based instructions. As long-term memory, memory 111, may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, and the like.

The term "processor" as used herein may additionally or alternatively refer to a controller. Processor 112 may for example relate to various types of processors and/or processor architectures including, for example, embedded processors, communication processors, graphics processing unit (GPU)-accelerated computing, soft-core processors and/or embedded processors.

Mobile device communication module 113 may, for example, include I/O device drivers (not shown) and network interface drivers (not shown) for enabling the transmission and/or reception of data over network 130. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, Bluetooth®, Zig-Bee™, near-field communication (NFC) and/or any other current or future communication network, standard, and/or system.

Platform 110 may be operative to support various types of connectivity protocols such as, for example, LAN, USB2/3 CAN BUS, RS-232 as well as inter circuit connectivity such as SPI, I2C, UART etc. Further, platform 110 can be operative to provide SNMP support V1, V2, V3 (full protocol including all encryption modes) and redundancy mode, for example, SMS when cellular data connection fails and/or dual SIM option. In some embodiments, platform 110 may be fully compliant with regulations and standards of security and encryption, including automotive-grade and connected devices standards, and thus be protected against break-ins, viruses and/or any other hostile activity. For example, platform 110 may filter the communication and/or command flow such to protect platform 110 and/or vehicle 105A from hostile takeover. In some embodiments, platform 110 may communicate with the main vehicle's computing systems via a unique, tightly managed virtual machine interface enabling the device to read the vehicle's vitals and stats and display them in a friendly and safe (e.g., Android-based) manner to the driver. Security layers embedded in platform 110 may include secure boot in order to ensure stability and reliability the boot code must be protected against hacking and modifications. In some embodiments, platforms 110 may be designed to be located and fitted in accordance with relevant regulations, standards and the vehicle and component manufacturers' instructions for installing platform 110 in vehicles.

In some embodiments, sensors 114 may comprise inertial and non-inertial sensors. Inertial sensor 114 may include, for example, one or more accelerometers and/or gyroscopes. Non-inertial sensors 114 may include, for example, one or more barometers, proximity sensors, altimeters, magnetometers (e.g., a 3-axis compass), light sensors, touch screen sensors, receivers of a Global Positioning System, and/or a front and/or back camera.

Power module 119 may comprise for example a chargeable battery, a non-chargeable battery and/or an interface for receiving power from an electric grid. Power module 119 may for example be embodied by the battery employed by vehicle 105A.

Memory 111 may include instructions which, when executed by processor 112, may result in the running or execution of an application or applications 115. The terms "running" and "executing" with respect to the implementing of applications may be used interchangeably.

Memory 111 may include instructions which, when executed by processor 112, cause the execution of the methods, processes and/or operations for minimizing or at least reducing the resources of communication network 130 in system 100 which would otherwise be required. Such methods, processes and/or operations may herein be implemented by decision engine 116. Methods processes and/or operations for network management may be implemented by network management engine 117 which may replace human interface monitoring and repeated manual optimization adjustments. Network management engine 117 may for example automatically monitor and, responsively, control interconnected devices for optimization. For example, network management engine 117 may for example a multitude of sensors 114. The network management engine may be configured to enable, for example, user management, redundancy, online graph generator and/or Google® maps connection.

The term "engine" as used herein may refer to or comprise one or more computer modules, wherein a module may be a self-contained hardware and/or software component that interfaces with a larger system (Alan Freedman, The Computer Glossary 268, (8th ed. 1998)). Such module may be embodied by a circuitry and/or a controller programmed to cause the systems (e.g., the platform and/or host system) to implement the methods, processes and/or operations as disclosed herein.

In embodiments, some functions of decision engine 116 may be implemented on platform 110 and some in cloud 120. For example, onsite and cloud resources may be shared. However, in any case of offsite implementations of decision engine 116 the transmission criterion are still met. In some embodiments, decision engine 116 and network management engine 117 may be implemented on platform 110 only.

According to some embodiments, decision engine 116 may be configured to ensure that during most of the time which is required for running or executing application 115, the onsite platform's computing resources are engaged rather than those of cloud 120, e.g., for telemetry analytics. In embodiments, decision engine 116 may ensure that most or all of the computing resources required for running applications 115 are utilized onsite. Accordingly, for the running of application 115, the utilization of the resources of network 130 may be comparably reduced, minimized or not even required. For example, at any given time of bandwidth measurement during the running of application 115, the bandwidth utilized in a communication link for communicating with cloud 120 via network 130 may be less than, e.g., 30%, 10%, 5% or 1% of the bandwidth that would be required if input application data (or simply: "data") had to be transmitted from platform 110 to cloud 120 for offsite processing to result in the running of application 115. In some embodiments, the transmission criterion may be expressed in units of frequencies, defining a bandwidth limitation for the data transmission via the uplink.

According to some embodiments, decision engine 116 may monitor the performance of processor 112 for executing a task relating to a given application and, in the event an offsite transmission criteria is met, cause the transmission of input application data from platform 110 to cloud 120 for the execution of the task by one or more remote servers 122 and/or 124. For example, decision engine 116 of platform 110 may invoke the establishment of a wireless communication link with cloud 120 over network 130, in the event that the computing resources exceed a computing power threshold for a given time period. For example, in the event that utilization of the computing resources of processor 112 for performing a certain task exceed a utilization threshold (e.g., as determined by decision engine 116), data required for executing the particular task may be transmitted to cloud 120 via network 130. For example, to reduce computing resources of processor 112, some of the task may be accomplished in cloud 120 instead of by application 115. Data relating for a task to be completed may be transmitted back to platform 110 via communication module 113. Processing onsite may reduce network infrastructure usage down to, for example, 1:1000 or to another, e.g., smaller ratio, of the other current networks setup.

According to some embodiments, the offsite transmission criterion may also relate to a maximum operating temperature. For instance, if the temperature of processor 112 exceeds a predetermined threshold, processing resources may be transferred from processor 112 to cloud 120. Accordingly, data may be transmitted to cloud 120 for processing. According to some embodiments, the offsite transmission criterion may relate to a request received at platform 110 for transmitting data to cloud 120. For example, responsive to such request received at platform 110 which is indicative of demand to obtain data relating to application 115, such data may be transmitted from platform 110 to cloud 120. In other words, data may only transmitted to cloud 120 on-demand and, e.g., while the offsite transmission criterion is met.

According to some embodiments, the data transmission criterion may relate to a bandwidth of a communication link between platform 110 and cloud 120. For example, the criterion may define that the bandwidth utilization shall not exceed a bandwidth threshold. For instance the data demanded from platform 110 may be transmitted to cloud 120 at a rate which does not exceed a bandwidth threshold defined by, e.g., decision engine 116. In some embodiments, an administrative body of cloud 120 may receive notification of such bandwidth threshold. In some embodiments, cloud 120 may receive (e.g., periodically) bandwidth threshold information defined by, e.g., decision engine 116. Cloud 120 may adjust its demands to receive data from platform 110 according to the bandwidth threshold information received, e.g., from platform 110. In some embodiments, only data which is necessary or required by cloud 120 may be transmitted, reducing traffic and cloud processing resources.

According to some embodiments, data transmitted to the cloud may be pre-processed (e.g., compressed, hashed and/or otherwise processed) for the offsite transmission criterion to be met. Such pre-processing of data by platform 110 and sending the data in hash code format to cloud 120 may reduce network infrastructure requirements of network 130 down to, for example, 1:1000; 1:5000; or to another, e.g., smaller ratio, of the other current network setup. For example, platform 110 may comprise a hash code generator element (not shown) to reduce or minimize bandwidth needs for data transmission. Accordingly, data quality may not have to be compromised despite a reduction in data transmission.

In some embodiments, the extent of the pre-processing may be dynamic, e.g., based on the set transmission criterion and the available computing resources. For instance, for a given bandwidth threshold indicated by percentage, data may be hashed to a lesser extent the greater the available bandwidth resources.

According to some embodiments, the transmission criterion may relate to distinguishing between critical and non-critical data to be processed. In some embodiments, critical data may be processed onsite only. The term "critical data" as used herein may comprise data which if corrupted and/or lost, compromise the capability to properly run application 115 and/or decision engine 116. For instance, the transmission criterion may define that only non-critical data is transmitted from platform 110 to cloud 120. Accordingly, critical data may not be transmitted to cloud 120 but remain stored and, if required, processed in platform 110. Examples of critical data may comprise vehicle brake data; steering data; vision data; fuel data; velocity data; car engine sensor data; bio metric data; collision warning system data; voice data recorded during driving; tire pressure sensor data; and/or driver authorization data. Examples of non-critical data may comprise GPS data and/or entertainment system data; window control, outside and in-car humidity, pressure and/or air temperature data. Clearly, the classification of data into critical and non-critical data may be performed differently than what is outlined herein. In addition, criteria according to which classification is made into critical and non-critical may change dynamically, e.g., based on information received at platform 110. In some embodiments, the rules for classifying data into critical and non-critical data may be updated dynamically, e.g., periodically, for instance, while the vehicle is driven.

In some embodiments, critical elements and/or features of vehicle 105 may remain in vehicle 105, e.g., in a decentralized manner (e.g., as Engine and/or electronic control units or ECUs). In some embodiments, the vehicle's critical systems may remain fully autonomous while other, non-critical systems such as, for example, entertainment, information and communication, may be unified and/or implemented on platform 110.

According to some embodiments, the computing elements of platform 110 (including, e.g., memory 111 and processor 112) are integrated on the same printed circuit board or PCB (not shown) and communicably coupled with each other via signal lines integrated on the PCB. According to some embodiments, the term "onsite processing" may thus refer to "on-board processing". More specifically, the onsite processing data may for example be performed on the same PCB. In some embodiments, components of platform 110 may communicate with each other over short-range wireless networks.

A plurality of applications 115 may be handled by memory 111 and processor 112. Accordingly, the plurality of applications 115 may be run by components or modules which are arranged in a non-distributed platform architecture. Such non-distributed platform architecture may be implemented for example in vehicles, herein designated by labels 105A and 105B which may for example be passenger cars. In other words, the architecture of platform 110 may provide so-called "All-in-One" Application running capabilities. Therefore, platform 110 may be free of communication cables which would otherwise have to be installed for communicably coupling applications modules or ECUs installed in a distributed manner (e.g., on different PCBs remotely located from one another) in a vehicle (not shown). In some embodiments, platform 110 may be operatively coupled with native vehicle ECUs, distributed in vehicle 105 A.

Since the need for the transmission of data to cloud 120 for performing, e.g., remote analytics of data gathered at platform 110, may be reduced or eliminated at least during some time periods, application 115 may have real-time responsiveness. In other words, remote-site analytics may be reduced or eliminated. Further, the risk of wireless data interception is reduced or eliminated. Accordingly, the system may enable real-time machine-to-machine (M2M), Internet of Things (IoT) and/or Internet-of-Vehicle (IoV) performance by performing on-site processing (and/or processing by edge devices), including, e.g., execution of onsite or on-board encryption, for example, on dedicated on-board hardware e.g., for automotive and industrial applications or any other critical application without implicating performance of host system 110, e.g., prior to uploading the data to cloud 120. Thus, the transmission of metadata for example to the cloud or other external systems may be avoided or significantly reduced. Accordingly, network load of network 130 is reduced. In some embodiments, platform 110 may also be configured to allow for parallel processing. In some embodiments, platform 110 may enable local and remote vehicle to sensors (V2S), vehicle to road (V2R) and Vehicle to Everything (V2X) communication.

According to some embodiments, encryption standards employed by platform 110 may include, for example, AES-256 or AES-512. In some embodiments, platform 110 may comprise encrypted and/or restricted 'SW update zones' or areas, which may be embedded and run on dedicated hardware Platform 110 may be operative to enable boot feature which may be protected against hacking and/or modifications. For that purpose, for example, a digital signature based on a private key for the boot-image and verified by the system when it boots. The digital signature may be placed in an internal section that may not be modifiable. The cryptographic algorithms that may be applicable to secure boot may include Digital signature algorithm such as, for example, RSA-PSS (e.g., 2048 bit), Hash algorithm (e.g., SHA256) and/or Public key integrity verification algorithm (e.g., HMAC SHA256). In some embodiments, platform 110 may include Kernel level security that may include Disk encryption (for example, Encryption of specific storage areas using, e.g., SHA256); Internet protocol security that may include authenticating and encrypting each IP packet of a communication session; and/or additional algorithms that may be used for key exchange, integrity tests and encryption. User space security may include, for example, SSL (secure socket layer)/TLS (Transport Layer Security) to ensure the security of data communication used in the transmission layer. Encryption and security over Wi-Fi may include, for example, WPA/WPA2; WEP 64-bit and 128-bit; and/or IEEE 802.11i security standard which may include, for example, Advanced Encryption Standard (AES); Counter Mode CBC-MAC Protocol (CCMP); Cipher-Based Message Authentication Code (CMAC); Wired Equivalent Privacy (WEP) with Temporal Key Integrity Protocol (TKIP); WLAN Authentication and Privacy Infrastructure (WAPI). Moreover, platform 110 may support the 802.11e Quality of Service (QoS) standard for video, voice and multimedia.

According to some embodiments, the system may be configured so that an application programming interface (API) implemented, e.g., by user interface 118, may have a plurality of different access (e.g., three) levels or "software zones": "closed API", "restricted API" and "open API". The API may be closed, for instance, for the driver driving the car and restricted for the driver when he/she is in "idle state", i.e., when the driver is sitting in the driver's seat but not driving. For backseat passengers the API may be "open", i.e., configurable by the passenger.

According to some embodiments, data processed by platform 110 may be provided to other devices served by system 100 (e.g., other vehicles or devices such as sensors 114 for example).

According to some embodiments, a private local fog network using other devices (e.g., sensors 114) may be created in the event that a computing power threshold is exceeded. The topology of such private local fog network may change dynamically and/or may be established using moving host systems (e.g., vehicles). For example, platform 110 of a driving vehicle 105A may be a member or node of a fog network.

According to some embodiments, a plurality of boards (not shown) may be modularly and communicably interconnected using a rack system in platform 110. For example, platform 110 may be configured to enable per-user configuration (which may be, e.g., a customer and/or manufacturer) of vehicle 105A according to its preferences for each (e.g. vehicle) model. This feature may herein be referred to as a so-called "mix & match" (M&M) capabilities of platform 110, in which various boards may be modularly interconnected, according to requirements and/or needs of the user of platform 110. Each board of a plurality of modularly communicably connectable boards may enable communication through analog and/or digital industrial- and consumer interfaces (e.g., CAN/RS232/Ethernet/USB 3.0/HDMI). Thus, the integration time of platform 110 with the original vehicle 105A or other existing infrastructure and/or system, including, for example, connection with vehicle ECU is reduced or minimized. Moreover, platform 110 may be connectable to multiple and varied external sensors including, for example, high-rate input sensors such as voice and/or video capturing sensors, for allowing, e.g., multipurpose real-time machine talk.

In an embodiment, platform 110 enables its installation in the field, e.g., in a vehicle, to function as a hub for external connections to vehicle 105 so that for the installation and configuration of platform 110, e.g., in vehicle 105A, no additional units such as main managing units, repeaters and dedicated hubs may be required, for example, for security implementations.

The platform's applications and/or engines may gather much more data than other units natively operating, e.g., vehicle 105A, opening options for more actions and therefore also more revenue streams, for example, when used in implementations such as car rentals, car sharing, emergency, vehicle servicing and/or the like.

According to some embodiments, processor 112 may have a processor architecture which employs a plurality of cores (for example, at least four cores, at least eight cores, or for example four to eight cores). For example, platform 110 may be an on-site, fully functional processing unit and server capabilities and may for example have 4 to 88 RISC (e.g., ARM-based cores (or any other processor(s) employing reduced instruction set computing (RISC) architecture), e.g., through multiplication of the cores, for example, via RF connectivity. Platform 110 may thus provide onsite processing power capabilities matching those of cloud 120. Processor 112 may for example enable a real-time, high-end media experience while maintaining robust automotive grade form factors. Such RISC-based processors may controlling (e.g., channeling and/or allocating) of their processing power and/or their power consumption in M2M applications.

In some embodiments, platform 110 is able to utilize multiple cores of processor 112 in different configurations under a single operating system and switch between cores-depending on the application's real-time needs for processing power. The processing core performances may be monitored by decision engine 116. Based on the monitoring, decision engine 116 may adjust and/or select the operation of the processor's cores.

According to some embodiments, different processors cores on the same board may be utilized, e.g., for energy resource management. In some embodiments, real-time switching may be performed in case of sudden need for processing power. Dedicated IP may be employed. In some embodiments, platform 110 may be able to utilize multiple cores in different configurations under a single operating system and switch between the cores, depending on the application's real-time needs. This may for example be utilized when for example a car's battery is running low or drops below a charge threshold.

For example, one or more of a plurality processors and/or cores be selected, for example based on the battery power available and/or the application(s) running. Platform 110 may for example operate based on a voltage charge range from, e.g., 5.4V to 60V. Decision engine 116 may be operative to select one or more DC sources (not shown) of a plurality of available DC sources (not shown) for powering platform 110 according to profile usage, e.g., allowing Power vs. Performance scalability for optimizing the power consumption by platform 110. Additionally or alternatively, applications 115 may be selected to enter a "sleep" mode, to hibernate, or to shut of completely. In this manner, with respect to a battery (e.g., car battery) capable of providing electric power when the available electric charge is above a high charge threshold of, e.g., 12 V, the processors and/or cores may still be employed to execute a selected application 115 such that even when the battery has depleted to below a charge threshold of, e.g., 4.8 V, 4.5 V or below, emergency systems like, for example, "eCall" may be still be operational. In some embodiments, multiple standby states with very low power consumption (e.g., less than 0.5 Watts) and external wake-up capabilities are available which may be tailored to fit different preference profiles. In some embodiments, platform 110 may for example operate according to various charge ranges. For instance, at the high charge threshold of, e.g., 12V utilizing an external DC source, with power vs. performance scalability for optimizing the power consumption for each usage profile. If the charge is between the high threshold and a medium-high threshold (e.g., at 4.8V), platform 110 may maintain full functionality yet disable some non-critical applications 115 such as, e.g., speakers; and maintains the ability to charge over the USB downstream ports for emergency needs. If the voltage charge is between the medium-high and a medium-low threshold value, (e.g., at about 4.0V), platform 110 and vehicle 105A may still maintain full functionality, and disable non-critical applications 115 in addition to disabling the speakers including, for example, USB and other peripherals while maintaining the ability for critical applications 115, and place emergency calls over the platform's cellular modem. In other words, decision engine 116 may continuously monitors power input and disable any one of applications 115 (e.g., vehicle subsystem) at any given input level to reduce the depletion rate of power module 119 while allocating the remaining energy available from the power module for emergency calls.

If required, platform 110 can in some embodiments operate from a single supply of e.g., 5V or less. In some embodiments, platform 110 may operate from a fully serviced battery (e.g., single cell 4.2V rechargeable Li-Ion or Li-Polymer Battery) as well as AC Adaptor or even USB (optional), allowing the AC Adapter or the USB Port to simultaneously power the system and charge the Battery. In some embodiments, platform 110 may be powered at all times. For example, first, by either AC or USB input—autonomous power source selection (AC Adapter or USB) with priority chosen by, e.g., the user or vendor of vehicle 105A, and secondly based on the available voltage charge. The transfer of power occurs when the input source of voltage charge drops to the battery's voltage. For maximum efficiency with limited sourcing capabilities, a power supplement mode may be invoked allowing a battery of vehicle 105A to provide input current via, e.g., a USB port and/or an AC Adaptor input.

According to some embodiments, platform 110 may comprise passive cooling elements (e.g., Peltier-based cooling pumps).

According to some embodiments, faster processors (with higher power consumption) may be employed for multimedia applications when the available battery energy is above a threshold. Decision engine 116 may for example cause the switching of higher power consumption processors to other processors with relatively lower power consumption when the available battery power (e.g., from power module 119) has depleted to below a certain threshold and/or when platform 110 runs an application or applications 115 that require relatively less power.

In some embodiments, platform 110 may fully shut down itself, including the initial DC-DC point of load and still allows sufficient power-down sequence to prevent an operating system run by platform 110 to perform a hard shut-down. For example, platform 110 may detect when the switch turns off and may use the battery as backup for the power-down sequence time period (e.g., about 10 seconds) before completely shutting down and will be turned on only when the driver is starting the engine of vehicle 105A.

According to some embodiments, platform 110 may be operative to run several operating systems in parallel and/or, for example, according to the tasks or applications 115 they are determined to be best suited for, e.g., as determined by decision engine 116. The decision when to run which operating system for which application 115 may be taken by decision engine 116, based on a resource optimization criterion. For example, some protocols may be used with their native Operating System while others may run with non-native operating systems or scripts. Platform 110 may for example be configured to run Android-based operating system, e.g., for human interaction and run in parallel the vehicle's proprietary systems in the background. Additional or alternative operating systems that may be run by the system may include, for example, Linux, UBUNTU and/or DEBIAN. In embodiments, additional or alternative operating systems may be employed. Platform 110 may for example have a Virtual Machine architecture run by a hypervisor for allowing the running of more than one operating system simultaneously and which can employ a plurality of (e.g., 40) cores by running them in parallel-processing mode between distributed devices. The Virtual Machine architecture may reduce the required computing power by at least 90%, for example, compared to an architecture which does not employ such Virtual Machine architecture. Accordingly, the required computing power may for example be reduced to 10% or less; or 5% or less.

According to some embodiments, network management engine 117 may be operative ensure that for example sensors 114 and/or components, modules and/or engines to be always connected by inter-technology data transfer (using for example data hopping, point-to-communication and/or mesh networking) so that, in case of connectivity loss between two devices or sensors or between vehicles, platform 110 is able to migrate the data via alternative wireless methods on platform 110, such as for example between Zigbee™ to sub-1 Ghz, Bluetooth®, 4G/3G/2G and/or Wi-Fi protocols. Accordingly, sensor data collection for example may be ensured, avoiding dead zones or areas to which a user of platform 110 is "blind", i.e., does not receive sensor data. Additionally or alternatively, network management engine 117 may ensure that data may always be transmitted from one platform to an external system (e.g., vehicle 105A) using, e.g., data hopping and/or meshing. For example, network management engine 117 may allow continuous or substantially continuous and full coverage by providing fallback (e.g., migrate data) in case of limited coverage by operators. For instance, this may give a driver varied ways of continuously communicating with vehicle 105A and with the vehicle's surrounding and/or cloud 120. Meshing may for example be employed to establish communication links between vehicle 105A and other vehicles.

In some embodiments, a mesh network may be utilized for transmitting data descriptive of traffic information from one vehicle to another. Considering for instance a scenario where a platoon of vehicles share the same lane and drive in the same direction. A first vehicle in the driving direction (or head of the platoon) restricts a driver's vision of a vehicle second in the platoon regarding traffic ahead of the first vehicle. Moreover, the sight of a driver and/or imaging system in a third vehicle of the platoon is restricted by the second vehicle. The second vehicle is positioned between the first and third vehicle. Hence, a sudden change in the driving behavior of the first vehicle may not be identified by the third driver and/or the imaging system directly but may be identified based on the response of the second vehicle. This chain of responses may cause significant delay in the action required to be taken to avoid collision of the third vehicle with the second vehicle for example. In embodiments, platform 110 installed on the first vehicle may transmit data indicative of a sudden or unexpected change in the driving behavior of the first vehicle (e.g., emergency braking) to the second vehicle and from the second vehicle to the third vehicle. Hence, despite there being no direct line-of-sight between the first and the third vehicle in the platoon, the third vehicle (e.g., its driver and/or imaging system) may be notified instantly or substantially in real-time about any change in the first vehicle's driving behavior. Accordingly, the driver and/or the imaging system of the third vehicle may become of aware of such change in driving behavior at the same time as the driver and/or imaging system of the second vehicle whose driver has direct LOS with the first vehicle. It is noted that the imaging system may comprise or be part of a vehicle safety or collision warning system.

According to some embodiments, communication module 113 may support multiple analog sensors and audio/video interfaces alongside RF connectivity methods. Non-limiting examples may include 4G LTE enhanced multi-regional stack, enabling both voice and data communication with 50 Mbps UL and 100 Mbps DL, supporting for example the following bands: 700, 850, AWS1700—North America AT&T, 700, AWS1700—North America Verizon, 800, 1800, 2600—Europe and Australia; 1800, 850—Korea; 3G enhanced multi regional stack enabling both voice and data transfer; HSPA+ data (e.g., at least 21 Mbps downlink (including but not limited to category 14) and 5.76 Mbps uplink (category 6) with built-in UDP/TCP/FTP/SMTP and IP stack. Communication module 113 may for example supporting the following Pentaband frequencies: 800/850, 900, AWS1700, 1900 and 2100 MHz for UMTS/HSPA+; 2G enhanced multi regional stack, enabling both voice and data transfer.

In some embodiments, communication module 113 may include a multi-band modem supporting the following non-limiting examples of frequencies: 850, 900, 1800 and 1900 MHz for GSM/GPRS/EDGE fall-back; Bluetooth®: full support for BT 3.0 or higher+High Speed (HS); also compliant with BT 2.1+Enhanced Data Rate (EDR). Bluetooth® 4.X for example may facilitate connecting to other platforms, systems and/or devices, lower power consumption and improve security.

In some embodiments, platform 110 may include a positioning system (GPS and/or GLONASS) like, e.g., a LI 1575.42 MHz Assisted-GPS. The positioning system may for example have cold Start Autonomous (acquisition sensitivity): −147 dBm with Time to First Fix (TTFF) from Cold Start of 42 Sec and TTF from Warm Start of e.g., 30 Sec or less; Hot Start Autonomous: −161 dBm or less or higher with TTF from Hot Start of, e.g., 1.8 Sec or less; and as a Tracking mode: e.g., −166 dBm or less or higher.

In some embodiments, communication module 113 may be Wi-Fi Compliant with e.g., IEEE 802.11b/g/n standard or with a full implementation of the power management functions specified in the IEEE 802.11 standard to minimize the system's power needs. In some embodiments, platform 110 may include a satellite connectivity subsystem and/or enable V2V (Wireless Access in Vehicular Environment).

In some embodiments, platform 110 may enable communicably connecting vehicles, as well as their drivers and/or passengers to an Internet-of-Things (IoT) ecosystem which may range from a "smart" thermostat, "smart city" setup, (domestic) smart grid (which may include electric grid efficiency elements), public hotspots, through "smart" traffic management (route optimization, parking space management, road status notifications), to the "smart" home and/or any other connected device and/or system, so that cars on the road can be synchronized and coordinated. It is noted that the system may be employed for implementing a variety of setups including, for example, a "smart city" setup, a smart grid (including e.g., domestic smart grid) (which may include electric grid efficiency elements), public hotspots, "smart" traffic management (route optimization, parking space management, road status notifications), the "smart" home, and the like. Accordingly, the system may be installed at residences to implement the "smart" home for example.

In some embodiments, one or more or all features of platform 110 may employ autonomous, user-friendly yet robust and encrypted interfaces which may for example be Android-based. The system may for example provide features that may include full-HD and 3D capabilities. The system may for example comprise a 4.1 High-Fidelity (Hi-Fi) audio subsystem.

In some embodiments, platform 110 may be configured to support a plurality of wired and/or wireless communication technologies of the system as well as for example camera and video features such as an augmented reality engine and a unique bird-eye view video-simulation engine. A video-simulation engine (not shown) may employ a plurality of image sensors 114 (e.g., nine cameras) as inputs to enable generating and simulating a bird-eye view of vehicle 105A to help the driver foresee lane drifts and other dangerous behaviors in the vehicle's surroundings. Image sensors 114 may be operatively coupled with the same electrical board of platform 110.

In some embodiments, platform 110 may include one or more imaging systems like, for example, a front camera (e.g., a full-HD camera) for providing an enhanced navigation experience. A front camera may be used to create an augmented reality display which allows the driver to keep an eye on the road while viewing graphic guidance from his navigation system.

In some embodiments, platform 110 provides the user remote-command, management and/or entertainment capabilities from the comfort of the vehicle at relatively increased quality.

In some embodiments, platform 110 may enable delivery e.g., in full-HD—at least some of the user's media content including, for example, location based advertisement; music; photo galleries; movies; and favorite shows over a friendly, e.g., Android-based user interface. A media player (e.g., served by one of applications 115) may employ a touch-panels interface/touch responsive interfaces and may support a plurality of video file formats with, e.g., 1080× 1920 pixels or higher, and audio output by using, e.g., 4+1 energy-friendly speaker sets supported by high-end codecs. The visual content may be delivered, for example, to one or more screens which may display the same or different content. In some embodiments, platform 110 may be connectable to existing screens.

In some embodiments, the signal processing capabilities of processor 112 may include image processing techniques such as, for example, noise reduction including, e.g., Periodic offset gain compensation, Anti-shading, De-speckle, Gamma correction, De-noise (multipath NR), Bayer format conversation into YUV, and/or auto focus, auto exposure and/or auto white balance.

In some embodiments, the signal processing capabilities of processor 112 may enable Post processing operations such as, for example, Dynamic range processing (DRC) for luminance compensation and/or Three-dimensional noise reduction (3DNR). Scaling for resizing and/or rotation may also be enabled.

In some embodiments, processor 112 may comprise a 3D, graphics accelerator.

In some embodiments, user interface 118 may comprise screens which may, for example, be based on the 3D standards of OpenGL ES 1.1, 2.0 and Render Script Compute.

In some embodiments, platform 110 may include a multi-format codec (MFC) hardware (HW) accelerator for enabling the encoding and/or decoding of Ultra-High definition (UHD) video (e.g., at pixel resolution of 3840×2160 or higher) at a rate of, e.g., 30 frames per second (FPS) for, e.g., H.265 and VP 8. Optimization and implementation. Such implementation may include, for example, Video For Linux Two (V4L2)) standard interface for video capture and output devices, OpenMAX IL implementation for all HW accelerated codecs, which is a cross-platform Application Programming Interface (API) that provides a comprehensive streaming media codec and application portability, and/or real-time coding of up to, e.g., 16 multi-channels for video codec formats such as, e.g., H.264, MPEG4, MPEG2, VC-13, VP 8 and/or H.263.

In some embodiments, user interface 118 which may be employed in an audio application 115, may include a Hi-Fi audio subsystem (e.g., 4.1 Hi-Fi Audio) of for example, comparably reduced topology. For instance, the Audio SubSystem may include two front and two rear Class D speakers' drivers of about 10WRMS each into about, e.g., $4\Omega$ with e.g., about 1% THD supplemented with a subwoofer Class D speaker driver of, e.g., about 15 W RMS into about, e.g., $4\Omega$ with about 1% THD. In some embodiments, output power can be boosted to, e.g., about 16WRMS on each of the speaker drivers and to e.g., about 32WRMS into 4f for the subwoofer speaker driver—without compromising the performance, e.g., 1% THD. In some embodiments, user interface 118 may include a multiple (e.g., 5)-band Customizable Parametric Equalizer for compensating for unwanted frequency characteristics in the loudspeaker by adjusting the output's frequency characteristics. The equalizer may also emulate different sound profiles and/or environments, like for example rock music and concert halls, to match the user's preferences. In some embodiments, the filter bandwidths and cut-off/center frequencies may be fixed by default to a given value, as may be the gains of individual bands (e.g., 12 dB to +12 dB). However, these can all be adjusted by the equalizer to create multiple profiles.

In some embodiments, audio application 115 may be configured to enable for example 3D Stereo Expansion by employing, e.g., configurable crosstalk mechanisms to adjust the depth or width of the stereo audio. In some embodiments, an audio application 115 may for example comprise an Audio Hub for providing improved or optimized audio-centric solution that is entirely autonomous to any cellular modem, FM Radio or other audio-capable devices. By employing an Audio Hub, both power consumption and performance may be significantly improved, e.g. to 100 dB SNR or below during DAC playback.

In some embodiments, audio application 115 may allow simultaneous configuration of two differential microphones for car environment recording (e.g., at least one of which can be software configurable to replace the headset microphone), e.g. along with car data sensor recording; one stereo single-ended line auxiliary input (e.g., docking an external jukebox/CD Player); and a plurality of (e.g., three) digital Audio I/F (AIF), two of which are completely asynchronous, used for audio applications (e.g., with Hi-Fi standards), cellular calls and Bluetooth® profiles with audio. These input sources can be mixed in various combinations and enhanced by passing through the parametric equalizer and/or 3D Expansion and played to speaker drivers (e.g., the 4.1 Hi-Fi), headphones and/or even recorded to memory 111.

In some embodiments, audio application 115 may employ techniques or modules designed to suppress pops that may otherwise be associated with start-up, shut-down or signal path control. The pop suppression controls may for example relate to the headphones, line output drivers and/or biasing controls.

In some embodiments, platform 110 may comprise a direct current (DC) servo circuit on the headphones outputs removes DC offset from these ground-referenced outputs. When enabled, the DC servo ensures that the DC level of these outputs remains within a minimum level of, e.g., 1 mV of the ground level.

In some embodiments, platform 110 may have a signal activity detector (not shown) that indicates when a signal is present on the respective signal path. The status signals can be used to control other events if required, e.g. wake the access point (AP) when detecting a microphone and starting a recording. One or more signal activity detection thresholds can be defined either as a peak level (or crest factor) and/or an RMS level. For example, when peak level is selected, the threshold is determined by defining the crest factor (peak to RMS ratio). When for example RMS level is selected, then a wide dynamic range threshold setting with granulation may be available.

In some embodiments, platform 110 may comprise one or more differential microphones for front-seat/driver environment and/or back-seat environment recording. One or more headphones can be connected. At least one of the headphones may include a single-ended microphone (headset).

In some embodiments, platform 110 may be configured to automatically detect accessory insertion and removal such as for example a microphone, the status of the hook switch and/or the position of a push button. The detection may rely on measuring an external load impedance, for example, when the accessory (e.g., microphone) is connected to the respective pin (e.g., microphone pin). In some embodiments, platform 110 may be configured to differentiate between a plurality of impedance levels (e.g., nine impedance levels) including, for example, the impedance related to a typical microphone, as well as a 'no detection' level when no accessory is connected, and at least two (e.g., seven) push-button levels. One level may be set such to detect a video accessory (e.g., about 75Ω or higher), and another to detect headphones (e.g., 3Ω or below). For secondary headphones, a circuit may detect jack insertion and removal.

In some embodiments, platform 110 may avoid or at least reduce the necessity of screen duplication and extension of the driver's own mobile phone via a phone application 115. In some embodiments, phone application 115 may enable encrypted communication (e.g., Android-based) using, e.g., a dedicated SIM card embedded in platform 110.

In some embodiments, platform 100 may be operative to alert, e.g., the driver of vehicle 105A, if a human being and/or a pet were left in the vehicle (based, e.g., on physical stimulus sensed by audio and video sensors).

In some embodiments, platform 110 may be configured to detect attempted theft and, for example, prevent the vehicle's ignition by unauthorized persons.

In some embodiments, platform 110 may support supports fully autonomous API and software development kit (SDK) for, e.g., Android (vehicle utilities, entertainment, information, personalized advertisement and more).

In some embodiments, platform 110 may allow making VoIP calls if required. The platform's 110 abilities may be fully compliant or adaptable to V2V standards, e.g. alerting the driver if vehicle 105A is in a collision course with another vehicle (e.g., vehicle 105B) and/or any other hazardous driving scenario.

In some embodiments, platform 110 may include a radio receiver (not shown) like, e.g., an FM radio receiver. The receiver may for example function on, for example, 76-108 MHz worldwide FM bands. In some embodiments, the receiver may enable the detection of the European Radio Data Systems (RDS) and the North American Radio Broadcast Data System (RBDS) modulations may be available. One of applications 115 may include a smart radio application which may monitor and analyze the listener's behavior (e.g., perform radio rating metering and/or personalization).

In some embodiments, platform 110 may be operative to allow the user to securely control remotely connected appliances, turn them on and off, and/or record or play any file and/or media.

In some embodiments, platform 110 may be autonomously managed, without any direct contact to the main computer (e.g., not shown) of vehicle 105A. In some embodiments, platform 110 may be operatively coupled with the systems of vehicle 105 A to enable remote tracking and recovery, including, for example, remote vehicle immobilization. In addition, platform 110 may enable advanced driver assistance features including, for example, Automatic Driving.

In some embodiments, for a friendly installation process, applications 115 of platform 110 may operate with a local language support—no matter where the system is being assembled on the vehicle, ideally designed for OEM installation. A local language menu is supported so that—no matter where platform 110 is being installed—the production line can test and set up platform 110 and configure it for installation in vehicle 105A for example.

In some embodiments, no part of platform 110 may obstruct the driver's field of view, e.g., as defined by applicable regulations. No part of the physical system of platform 110 may obstruct controls and/or displays of vehicle 105A required for the driving task.

In some embodiments, visual information may be displayed in vehicle 105A as close as practicable possible to the driver's forward line of sight (the device may not include a screen—the device connects to the pre-existing screen in the specific car model with its specific dashboard design, so that the interior design may not be impaired).

In some embodiments, platform 110 may be implemented using rugged and high-end Industrial use cases including real-time decision-making and telemetry. Platform 110 may have the ability to analyze data received from a variety and multitude of sensors 114, processing the received data onsite so that a system utilizing platform 110 may overcome low connectivity in remote and deserted areas.

In some embodiments, platform 110 may additionally or alternatively be employed in conjunction with healthcare, payment systems, homeland security, energy and industrial control (e.g., factory monitoring and control/Oil and Gas telemetry and monitoring like e.g., pipe leakage), and to implement a "smart" grid for real-time monitoring, analytics and response.

In some embodiments, platform 110 may be divided into a main system (not shown) and units or subsystems (not shown) of the main system (not shown) that may function as an extension of the main system (not shown). In some embodiments, platform 110 may employ have an ultra-low power system, equipped for example with a sensor and a single-core processor transmitting gathered data (e.g., by LAN or Wireless) to another system and function as an extension unit for the other system.

In some embodiments, platform 110 may enable an easy and friendly graphic IoT engine (sketchable IoT engine) allowing the network's owner to 'pick-and-place': firmware updates, deployment of new devices into the existing system, software/encryption updates, processing resources inputs or similar.

In some embodiments, platform 110 may rely on a strong front-end totally-virtual-cloud, which is decentralized, which may be implemented in cases where there is need to handle large data packets. This may be the case where it may be challenging to transmit the data to a single remote site for analytics; or in cases where the system runs strong processing onsite, with no reliance on cloud elements at all. This can happen in unpopulated areas, where there is a need to monitor large industrial applications with tens of thousands of sensors, but without a stable cellular (e.g., 3G or 4G) connection. In some embodiments, platform 110 may be employed in conjunction with a large smart-city setup, where platform 110 may use a front end fog infrastructure and so that cloud 120 can be saved for high-level, 'non-critical' analytics.

Exemplary Smart Home Hub Implementation

In some embodiments, platform 110 enable real-time communication between the user and his/her home appliances for enabling a home entertainment experience and/or home security. Platform 110 may for example utilize fully encrypted e.g., Android OS and API and SDK platforms, and may for example offer a full-HD OTT/IPTV streamer, 3D-enabled gaming console, full connectivity to other home appliances and cutting-edge voice and image processing capabilities. In some embodiments, the smart home hub may be configured to monitor the movement of its inhabitants such as, for instance, of a baby and/or toddler and provide an alert notification in case the baby/toddler is located in an area that may endanger him/her (e.g., near a swimming-pool, in the garage etc.).

In some embodiments, platform 110 may for example include smart electric grid efficiency elements; and/or enable interaction via voice command and/or with smart image sensors for monitoring a residence, such as IPT/OTT, 3D gaming hub, and video and music libraries.

Exemplary Fleet Management Implementation

In some embodiments, platforms 110 may be employed by a fleet management system (not shown) which may be configured to provide features such as driver diagnostics, driver behavior monitoring, workforce and resources optimization, route planning and/or navigation, e.g., in a business-to-business environment (B2B).

Exemplary Smart Office Grid Implementation

In some embodiments, platform 110 be operative for controlling (e.g., in an office environment) RF-based smart electric plugs, and used for implementing energy usage NMS tools, Ethernet ports analytics, face recognition security and/or authentication features and 'Safe Zone IT', e.g., in an office. For example, one of applications 115 may employ an image processing unit, for notifying of abnormal or suspicious behavior in restricted areas (such as for example an office's server room).

Exemplary Homeland Security Infrastructure

In some embodiments, platform 110 may optimize mass data processing with regards to, for example, face recognition identification. For example, a calculation algorithm may be downloaded to sensors 114 that are image sensors, and the algorithm identifies faces from the live stream and sends a, e.g., hash code to cloud 120. In some embodiments, a sensor 114 (e.g., image sensor) may have onsite processing capabilities, e.g., as outlined herein. In some embodiments, sensor(s) 114 may be able to update its/their algorithm on-the-fly. The implementation of onsite processing for sending the data hash encoded, can lower the size of data sent to cloud 120, for example, by a ratio of 1:5500, 1:10,000 or to an even lower ratio. In some embodiments, the data transmission speed be increased by a factor of for example at least 1000, 5000, 10000, or higher. An example of the effect of onsite data pre-processing prior to transmission to cloud 120 according to an embodiment, may be reflected by a reduction in the amount of data sent to cloud 120 from the originally required, e.g., 5.5 MB file size down to, e.g., 5 KB file size or less. 5.5 MB translates into a 44 Mb. Considering now for instance a 50 Mbs cellular bandwidth, the transmission time of a full 5.5 MB file is 44 Mb/50 Mbs=0.88 sec. For the data processed onsite, according to embodiments, the reduction in file size may be from for example 5.5 MB to 5 kB and hence, result in a reduction of 40 Kb or 0.04 Mb. Hence, for the onsite pre-processed data, the transmission time is reduced to 0.04 Mb/50 Mbs=0.0008 sec, which more efficient or faster by a factor of 1100 in this example.

Referring now to FIG. 2, a method for processing data while a host system is in use may comprise, for example, as indicated by step 210, receiving, at a platform (e.g., platform 110) installed in the host system (e.g., one of first vehicle 105A and/or second vehicle 105B) data relating to the running of host applications.

As indicated by step 220, the method may comprise, for example, processing at least some or all of the received data by platform 110 onsite such to obviate the need of sending the received data to cloud 120 for running the host applications.

Referring now to FIG. 3, showing a schematic flow chart of a method for processing data using predictive considerations, according to some embodiments.

Onsite processing platform 110 may receive or determine (304) data about the computing resources in an environment, such as a car. The data may include which computing devices are available onsite, their characteristics, communication capabilities, their data plans, battery health status or the like. Step 304 may be performed when starting a ride, upon user request, at predetermined time intervals, or the like.

Onsite processing platform 110 may receive or determine (308) data about one or more computerized tasks to be carried out, such as task description, criticality of the task, expected completion time, or the like.

Decision engine 110 may obtain (312) information about one or more future state of the environment. Each state may include a location and/or time at which the environment, such as the environment, e.g. the vehicle is expected to be. The information may be obtained from a calendar of a user associated with any of the computing platforms available onsite, from a navigation system via an associated interface, or in any other manner. It will be appreciated that a location or a time may refer to a range of locations or times.

Decision engine 110 may obtain (316) prediction about the resource availability at one or more future state, for example what is the available bandwidth at a particular location, with or without a time indication, what is the price of uploading or downloading data at the location and time, or the like.

Decision engine 110 may determine (320) a dynamic scheme for performing the task by performing part of the computerized task onsite and another part thereof offsite. The scheme is dynamic since it may be updated at a later time before the completion of the task, as detailed below. The scheme may comprise indications to which computations are to be performed offsite, which data is to be transmitted to cloud computing environment 120, and at what time. If a completion time is indicated, the expected time at which results may be received from cloud computing environment 120 may be indicated as well. The scheme is designed such that it complies with the constraints.

In some embodiments, scheme determination (320) may be performed as follows:

Decision engine 110 may determine (328) at least one scheme that complies with the constraints. The one or more schemes may be obtained using a solver such as a constraint problem solver (CSP), a linear solver, or any other solver.

Decision engine 110 may calculate (332) a value of a cost function associated with the task for each scheme. The cost function may involve factors of the scheme which are compromisable rather than constraints. It will be appreciated that if no cost function is provided, then determining one scheme may be sufficient.

If multiple schemes are determined, then decision engine 110 may select (336) the scheme that has the minimal cost value.

Once the scheme is determined, it may be executed by processor 112, comprising performing onsite parts (324), and utilizing network management engine 117 for transmitting (328) data using communication module 113 over a wireless communication channel to cloud computing environment 120, for performing the offsite part.

As described above, decision engine 110 may monitor the execution of the task. Decision engine 110 may also determine (332) when it is required or beneficial to reassess the scheme. Determination may also include assessing whether assumptions about available resources, such as bandwidth are indeed true, and whether the resources are utilized, as described above. It will be appreciated that the flowchart is not limited to performing the assessment only after wireless transmission. In alternative embodiments, the assessment can be performed at predetermined time intervals for example upon a clock signal, upon user indication, upon specific software instructions; upon events such as the vehicle stopping, which can be determined by the GPS, lost or resumed connectivity or the like.

When it is determined that the scheme is to be reassessed, execution may return to any one of the following: receiving data about the available computing resources (304) to receive the updated available computing platforms, updated battery health status, or the like; receiving task and task parameters (308) since parts of the task may have already been performed, so the workload may be distributed in a different manner between the onsite and offsite computing platforms; obtaining information about future state (312) since the route or the time of arrival to way points may have changed due for example to traffic jams, or the like; or to obtaining prediction about the resource availability at the future states.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system (e.g., platform 110) can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer readable and executable instructions from program software that implements a method disclosed herein, it in effect becomes a special purpose computer particular to an embodiment of the method disclosed herein. The techniques necessary to achieve this are well known to those skilled in the art and thus are not further described herein. The operations, methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

"Coupled with" means indirectly or directly "coupled with".

It is important to note that the method may include is not limited to those diagrams or to the corresponding descriptions. For example, the method may include additional or even fewer processes or operations in comparison to what is described herein in the Figure(s). In addition, embodiments of the method are not necessarily limited to the chronological order as illustrated and described herein.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Unless otherwise stated, the use of the expression "and/or" between the last two members of a list of options for selection indicates that a selection of one or more of the listed options is appropriate and may be made.

In the claims or specification of the present application, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

The term "real-time" as used herein may also encompass the meaning of the term "substantially in real-time" or "about real-time".

While this disclosure describes a limited number of embodiments, it will be appreciated that many variations, modifications and other applications of such embodiments may be made. The disclosure is to be understood as not limited by the specific embodiments described herein, but only by the scope of the appended claims.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for processing data, comprising:
   receiving by a computing device present at a vehicle environment, data relating to a computerized task, the data comprising a requirement for completion of the computerized task within a specified completion time;
   obtaining information related to a future state of the computing device or the vehicle environment or another computing device within the vehicle environment, the future state including future time and location at the future time;
   determining indications for network resource availability for the future time and location at the future time;
   determining a scheme for performing at least part of the computerized task offsite, and at least a part of the task onsite, in accordance with the network resource availability, wherein the scheme ensures completion of the computerized task within the specified completion time, and wherein the network resource availability is determined by processing power of additional computing devices available within the vehicle environment;
   performing a part of the task onsite; and
   transmitting data over a communication channel to a remote computing platform for performing the at least part of the computerized task offsite, in accordance with the scheme,
   wherein the scheme is updated after said determining the scheme and before the completion of the computerized task.

2. The method of claim 1, wherein determining the scheme comprises:
   determining at least two schemes for performing at least part of the computerized task offsite;
   computing a cost for each scheme of the at least two schemes; and
   selecting a scheme from the at least two schemes for which the cost is lower.

3. The method of claim 2, wherein the cost function takes into account available bandwidth for transmitting data to an external network and receiving data form the external network.

4. The method of claim 2, wherein the cost function takes into account required criticality of operations or of data.

5. The method of claim 2, wherein the cost function takes into account at least one factor selected from the group consisting of: performance parameters of the computing device, the offsite computing platform and other computing device within the vehicle; and required accuracy of the computerized task.

6. The method of claim 1, wherein the information related to the future state includes information received from a navigation system.

7. The method of claim 1, wherein the information related to the future state includes information received from a calendar event.

8. The method of claim 1, further comprising:
   determining when the scheme is to be reassessed; and
   subject to determining that the scheme is to be reassessed:
      repeating said receiving the data relating to a computerized task, said obtaining the information related to the future state, said determining indications for network resource availability; or said determining the scheme.

9. The method of claim 1, further comprising pre-processing the transmitted data in order to reduce network infrastructure requirements, wherein the pre-processing comprises applying at least one of: compression and a hash function.

10. A computerized system having a processor and a storage device, the processor being adapted to perform the steps of:
    receiving by a computing device present at a vehicle environment, data relating to a computerized task, the data comprising a requirement for completion of the computerized task within a specified completion time;

obtaining information related to a future state of the computing device or the vehicle environment or another computing device within the vehicle environment, the future state including future time and location at the future time;

determining indications for network resource availability for the future time and location at the future time;

determining a scheme for performing at least part of the computerized task offsite and at least a part of the task onsite, in accordance with the network resource availability, wherein the scheme ensures completion of the computerized task within the specified completion time, and wherein the network resource availability is determined by processing power of additional computing devices available within the vehicle environment;

performing a part of the task onsite; and transmitting data over a communication channel to a remote computing platform for performing the at least part of the computerized task offsite, in accordance with the scheme, wherein the scheme is updated after said determining the scheme and before the completion of the computerized task.

11. The system of claim 10, wherein the processor is further adapted to perform the steps of:

determining at least two schemes for performing at least part of the computerized task offsite, wherein the computerized task is expected to be performed as required, in accordance with the network resource availability;

computing a cost for each scheme of the at least two schemes; and selecting a scheme from the at least two schemes for which the cost is lower.

12. The system of claim 10, wherein the processor is further adapted to perform the steps of:

determining when the scheme is to be reassessed; and subject to determining that the scheme is to be reassessed, repeating said receiving the data relating to a computerized task; said obtaining the information related to the future state; said determining indications for network resource availability; or said determining the scheme.

13. A non-transitory computer readable storage medium comprising instructions which, when the program is executed by a computer, cause the computer to perform the steps of:

receiving by a processor of a computing device present at a vehicle environment, data relating to a computerized task, the data comprising a requirement for completion of the computerized task within a specified completion time;

obtaining, by the processor, information related to a future state of the computing device or the vehicle environment or another computing device within the vehicle environment the future state including future time and location at the future time;

determining, by the processor, indications for network resource availability for the future time and location at the future time;

determining, by the processor, a scheme for performing at least part of the computerized task offsite and at least a part of the task onsite, in accordance with the network resource availability, wherein the scheme ensures completion of the computerized task within the specified completion time, and wherein the network resource availability is determined by processing power of additional computing devices available within the vehicle environment;

performing a part of the task onsite; and transmitting, by the processor, data over a communication channel to a remote computing platform for performing the at least part of the computerized task offsite, in accordance with the scheme, wherein the scheme is updated after said determining the scheme and before the completion of the computerized task.

* * * * *